(12) United States Patent
Hosaka

(10) Patent No.: US 11,595,627 B2
(45) Date of Patent: Feb. 28, 2023

(54) LIQUID CRYSTAL PROJECTOR

(71) Applicant: SEIKO EPSON CORPORATION, Tokyo (JP)

(72) Inventor: Hiroyuki Hosaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 120 days.

(21) Appl. No.: 17/012,133

(22) Filed: Sep. 4, 2020

(65) Prior Publication Data

US 2021/0076015 A1 Mar. 11, 2021

(30) Foreign Application Priority Data

Sep. 5, 2019 (JP) .............................. JP2019-161659

(51) Int. Cl.
*H04N 9/31* (2006.01)
*G09G 3/36* (2006.01)

(52) U.S. Cl.
CPC ......... *H04N 9/3188* (2013.01); *G09G 3/3607* (2013.01); *H04N 9/3197* (2013.01)

(58) Field of Classification Search
CPC ... H04N 9/3188; H04N 9/3197; G09G 3/3607
USPC ...................................................... 349/5–10
See application file for complete search history.

(56) References Cited

U.S. PATENT DOCUMENTS

| 2010/0182482 | A1* | 7/2010 | Tanaka ................... H04N 5/349 348/333.12 |
| 2013/0083244 | A1 | 4/2013 | Hosaka et al. |
| 2015/0219983 | A1* | 8/2015 | Mashitani ............ H04N 9/3188 353/121 |
| 2015/0371577 | A1* | 12/2015 | Hosaka .................. G09G 3/007 345/56 |
| 2017/0054879 | A1 | 2/2017 | Hosaka et al. |

FOREIGN PATENT DOCUMENTS

| JP | H04-063332 A | 2/1992 |
| JP | 2012-155212 A | 8/2012 |
| JP | 2016-004237 A | 1/2016 |

* cited by examiner

*Primary Examiner* — Charles S Chang
(74) *Attorney, Agent, or Firm* — Oliff PLC

(57) ABSTRACT

A liquid crystal projector includes a liquid crystal panel having a pixel circuit that modulates light based on video data corresponding to each of pixels, and a shift device configured to shift the modulated light by the pixel circuit so that a position of a projected pixel on a screen by the modulated light is shifted for each of the pixels, wherein the pixel circuit modulates n pixels of a first group, n being an integer of 2 or more, from among pixels of an image specified by video data in first frame period, and modulates n pixels of a second group in second frame period next to the first frame period, and the n pixels of the first group are different from the n pixels of the second group.

4 Claims, 13 Drawing Sheets

LIQUID CRYSTAL PROJECTOR

The present application is based on, and claims priority from JP Application Serial Number 2019-161659, filed Sep. 5, 2019, the disclosure of which is hereby incorporated by reference herein in its entirety.

BACKGROUND

1. Technical Field

The present disclosure relates to a liquid crystal projector.

2. Related Art

Further, there is known a technique in which, in a liquid crystal projector using a liquid crystal panel, a position of a pixel projected onto a screen or the like is shifted by a shift device in order to artificially increase a resolution. Specifically, this technique is a technique in which one frame period is divided into a plurality of unit periods, and the position of the pixel to be projected is shifted so as to be different for each unit period. Note that, the one frame period refers to a time period required to display one frame of a video specified in video data supplied from an upstream device.

According to this technique, it is perceived that more pixels are projected than the number of pixels represented by the liquid crystal panel.

In recent years, as miniaturization and high definition of the liquid crystal panel proceed, and the gaps between pixel electrodes become narrower, an influence of an electric field generated between the pixel electrodes adjacent to each other, that is, the electric field (lateral electric field) in a direction parallel to the substrate surface, cannot be ignored. Specifically, a liquid crystal alignment failure (such as a reverse tilt domain) occurs due to the lateral electric field, and is visually recognized as a defect on display.

There is a problem that, when the position of the pixel is shifted by the shift device, the defect on display due to such an alignment failure is extended in this shifted direction and visually recognized, thus display quality is significantly degraded.

SUMMARY

In order to solve the above-described problem, a liquid crystal projector according to an aspect of the present disclosure includes: a liquid crystal panel having a pixel circuit that modulates light based on video data corresponding to each of pixels, and a shift device configured to shift the modulated light by the pixel circuit so that a position of a projected pixel on a screen by the modulated light is shifted for each of the pixels, wherein the pixel circuit modulates n pixels of a first group, n being an integer of 2 or more, from among pixels of an image specified by video data in first frame period, and modulates n pixels of a second group in second frame period next to the first frame period, and the n pixels of the first group are different from the n pixels of the second group.

BRIEF DESCRIPTION OF THE DRAWINGS

FIG. 7A to FIG. 7D are diagrams illustrating a relationship between a pixel of video data and a pixel represented by a liquid crystal panel.

FIG. 11 is a diagram illustrating an example of occurrence of an alignment failure in the liquid crystal projector.

FIG. 12 is a diagram illustrating an example of occurrence of an alignment failure in the liquid crystal projector.

FIG. 17 is a diagram illustrating an example of occurrence of an alignment failure in a comparative example.

DESCRIPTION OF EXEMPLARY EMBODIMENTS

Electro-optical devices according to embodiments will be described below with reference to the accompanying figures. Note that, in each figure, a size and a scale of each unit is different from the actual size and the actual scale of each unit as appropriate. Moreover, exemplary embodiments described below are suitable specific examples of the present disclosure, and various technically preferable limitations are applied, but the scope of the disclosure is not limited to these modes unless it is specifically described in the following description to limit the present disclosure.

Figure 1:
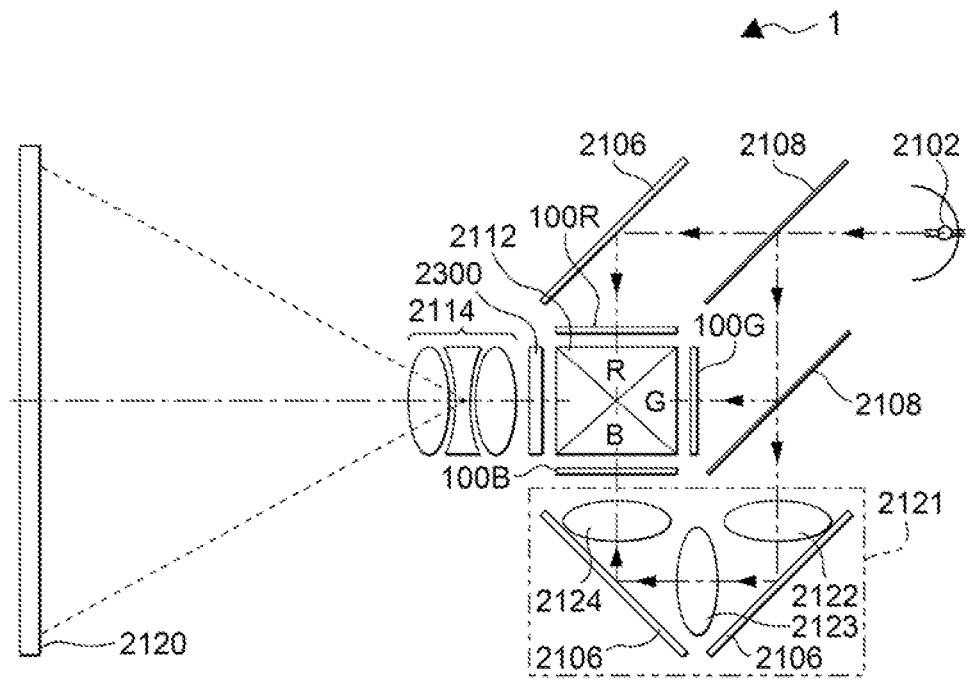
FIG. 1 is a diagram illustrating a liquid crystal projector according to an embodiment.

FIG. 1 is a diagram illustrating an optical configuration of a liquid crystal projector 1 according to a first exemplary embodiment. As illustrated in FIG. 1, the liquid crystal projector 1 includes liquid crystal panels 100R, 100G, and 100B. Further, a lamp unit 2102 including a white light source such as a halogen lamp is provided inside the liquid crystal projector 1. Projection light emitted from this lamp unit 2102 is split into three primary colors of red (R), green (G), and blue (B) by three mirrors 2106 and two dichroic mirrors 2108 installed inside. Of the light of the primary colors, R light, G light, and B light are incident on the liquid crystal panel 100R, the liquid crystal panel 100G, and the liquid crystal panel 100B, respectively.

Note that an optical path of the B light is longer than that of other red and green. Thus, the B light is guided to the liquid crystal panel 100B via a relay lens system 2121 formed of an incidence lens 2122, a relay lens 2123, and an emission lens 2124 to prevent a loss due to the optical path.

The liquid crystal panel 100R includes a pixel circuit arranged in a matrix and generates a transmitted image of R by light transmitted through a liquid crystal element of the pixel circuit, that is, by a modulated light from the liquid crystal element, based on a data signal corresponding to R. Similarly, the liquid crystal panel 100G generates a transmitted image of G based on a data signal corresponding to G, the liquid crystal panel 100B generates a transmitted image of B based on a data signal corresponding to B.

The transmitted image of each color generated by each of the liquid crystal panels 100R, 100G, and 100B is incident on a dichroic prism 2112 from three directions. Then, at this dichroic prism 2112, the light of R and the light of B are refracted at 90 degrees, whereas the light of G travels in a straight line. Thus, after image of each color has been combined, the combined image is incident on a projection lens 2114 via a shift device 2300. The shift device 2300 shifts the optical axis in the emission direction from the dichroic prism 2112. Note that, a shifting operation by the shift device 2300 will be described later. The projection lens 2114 enlarges and projects the combined image via the shift device 2300 onto a screen 2120.

Note that while the transmitted image by the liquid crystal panels 100R and 100B is projected after being reflected by the dichroic prism 2112, the transmitted image by the liquid crystal panel 100G travels in a straight line and is projected. Thus, the transmitted image of each of the liquid crystal panels 100R and 100B has a left-right inverted relationship with respect to the transmitted image of the liquid crystal panel 100G.

Figure 2:
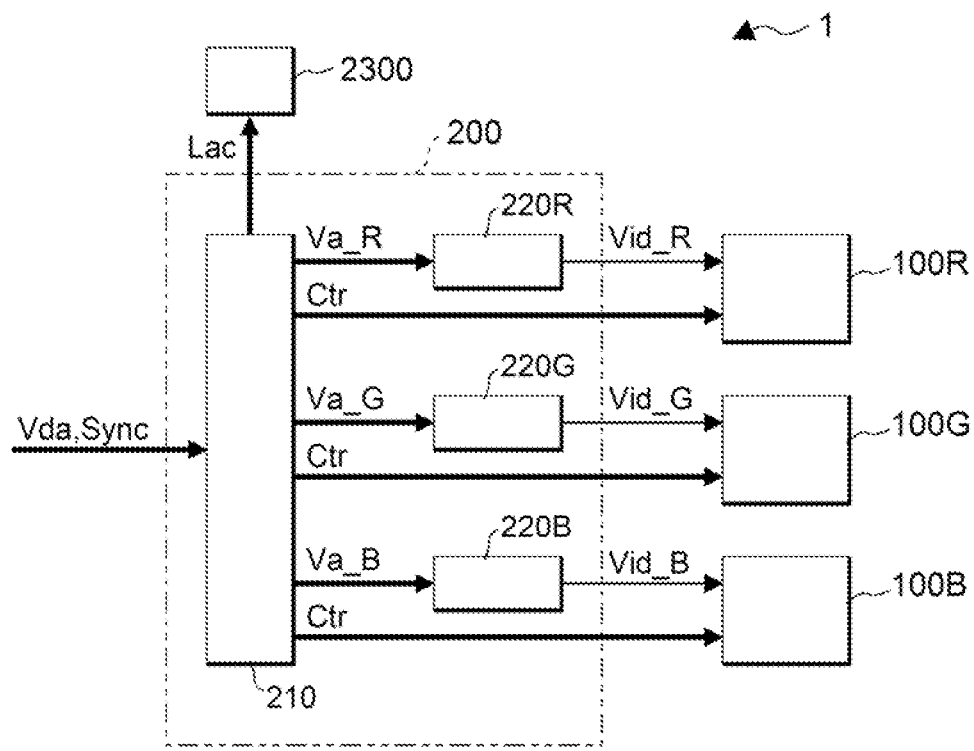
FIG. 2 is a block diagram illustrating a configuration of the liquid crystal projector.

FIG. 2 is a block diagram illustrating a configuration example of an electrical configuration of the liquid crystal projector 1. As illustrated in the figure, the liquid crystal projector 1 includes a video processing device 200, the liquid crystal panels 100R, 100G, and 100B described above, and the shift device 2300.

Video data Vda is supplied synchronously with the synchronization signal Sync from an upstream device such as a host device (not shown). The video data Vda, for example, specifies for each RGB by 8 bits, a gray scale level of pixels in an image to be displayed.

Note that, in the single liquid crystal panel 100R, 100G, or 100B, pixels are arranged in a matrix shape in a vertical direction and a horizontal direction. The arrangement of the pixels in which the gray scale level is specified in the video data Vda is, for example, twice in the vertical direction and twice in the horizontal direction as compared to the arrangement of pixels in the single liquid crystal panel 100R, 100G, or 100B.

Further, in the present embodiment, the color image projected on the screen 2120 is represented by combining each transmitted image of the liquid crystal panels 100R, 100G, and 100B, that is, by superimposing the image. Thus, the pixel that is the smallest unit of the color image can be divided into red subpixel based on the liquid crystal panel 100R, green subpixel based on the liquid crystal panel 100G, and blue subpixel based on the liquid crystal panel 100B. However, with respect to the subpixel in the liquid crystal panels 100R, 100G, and 100B, when it is not necessary to identify color and when only brightness problem, there is no need to express the subpixel as a subpixel. Thus, in the present description, the display unit in the liquid crystal panels 100R, 100G, and 100B is also described as the pixel.

The synchronization signal Sync includes a vertical synchronization signal indicating a vertical scanning start of the video data Vda, a horizontal synchronization signal indicating a horizontal scanning start, and a clock signal indicating timing of one pixel of the video data.

The video processing device 200 includes a display control circuit 210, processing circuits 220R, 220G, and 220B.

As described below, the display control circuit 210 stores at least one frame period of the video data Vda from the upstream device. Then, corresponding to the position of the pixel shifted by the shift device 2300 described later, that is, the number of shift position, the video data Vda for one frame period is divided and output. Thus, in the present embodiment, the number of shift position is four, and the display control circuit 210, corresponding to four unit periods, divides the video data Vda for one frame period into four. Then, in each unit period, the divided data is output for each RGB. Then, the display control circuit 210 controls so that the shift device 2300 shifts the optical axis in the emission direction from the dichroic prism 2112 as described below.

Specifically, first, the display control circuit 210 temporarily stores the video data Vda from the upstream device, reads out the R data of the pixels allocated for the unit period in the unit period, and outputs the data as the video data Va_R. Similarly, the display control circuit 210 reads out the G data of the pixels allocated for the unit period in the unit period, outputs the data as the video data Va_G, reads out the B data, and outputs the data as the video data Va_B.

Second, the display control circuit 210 supplies a control signal Ctr to the liquid crystal panels 100R, 100G, and 100B in every unit period.

Third, the display control circuit 210 supplies a control signal Lac for controlling the shift of the optical axis, to the shift device 2300 in every unit period. Note that in the present embodiment, the shift device 2300 can shift the position of the pixels of the liquid crystal panel 100 projected on the screen 2120 over two axes of a horizontal axis and a vertical axis.

Note that, for the convenience of description, the position of the pixels of the liquid crystal panel 100 projected on the screen 2120, which is the position of the projected pixel shifted (or not shifted) by the shift device 2300 is simply referred to as a shift position. Then, the shift device 2300 shifts the position of the projected pixel to be visually recognized.

The processing circuit 220R converts the video data Va_R to the analog voltage data signal Vid_R, amplifies it and supplies it to the liquid crystal panel 100R. Similarly, the processing circuit 220G converts the video data Va_G to the analog voltage data signal Vid_G, amplifies it and supplies it to the liquid crystal panel 100G, and the processing circuit 220B converts the video data Va_B to the analog voltage data signal Vid_B, amplifies it and supplies it to the liquid crystal panel 100B.

Then, the liquid crystal panels 100R, 100G, and 100G are described. With respect to the liquid crystal panels 100R, 100G, and 100G only the color of incident light, that is, the wavelength is different, and they are structurally common. Therefore, the liquid crystal panels 100R, 100G, and 100G are generally described with reference to numeral 100, without specifying a color.

Figure 3:
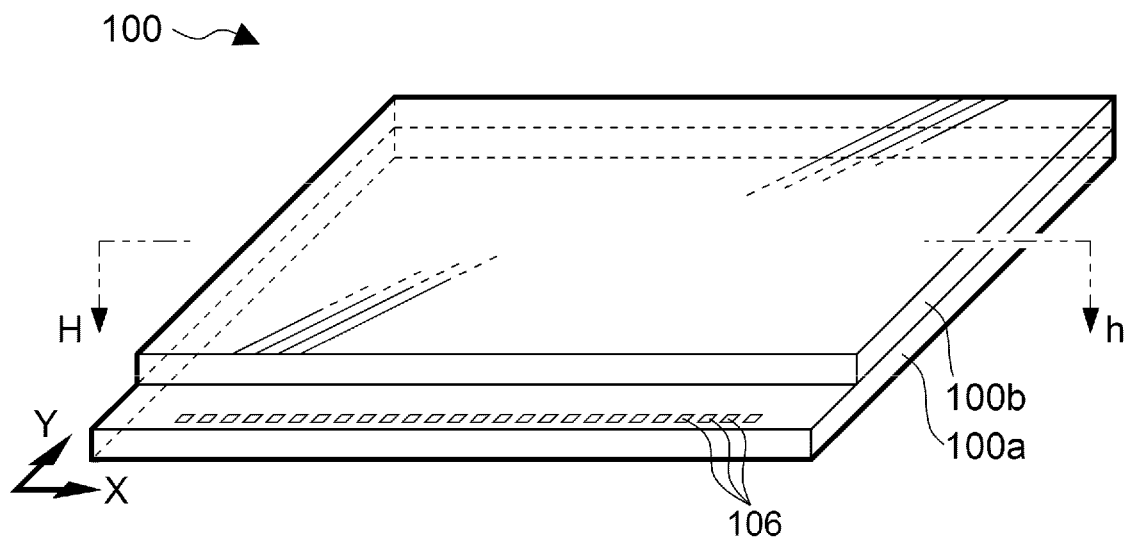
FIG. 3 is a perspective view of a configuration of a liquid crystal panel in the liquid crystal projector.
Figure 4:
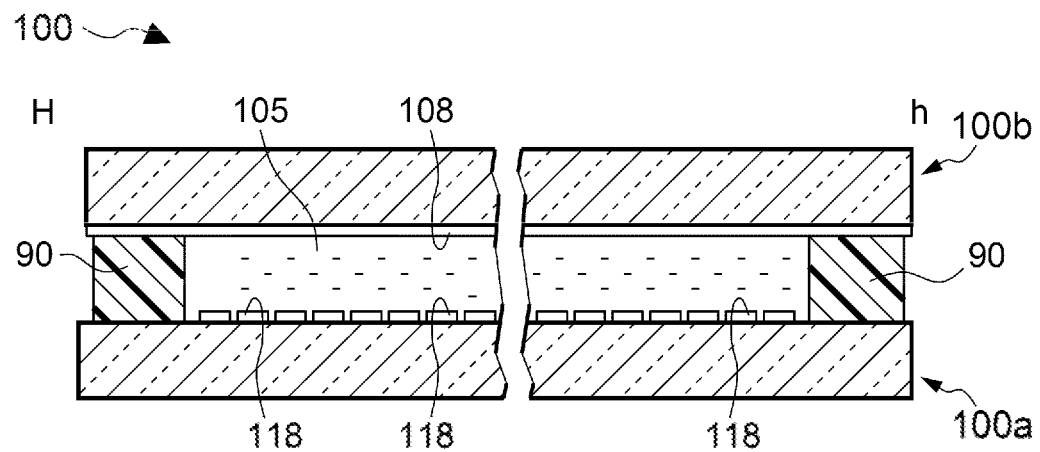
FIG. 4 is a cross-sectional view illustrating a structure of the liquid crystal panel.

FIG. 3 is a diagram illustrating a main part of the liquid crystal panel 100, and FIG. 4 is a cross-sectional view taken along line A-A in FIG. 3.

As illustrated in these figures, the liquid crystal panel 100 is configured that, an element substrate 100*a* provided with a pixel electrode 118 and a counter substrate 100*b* provided with a common electrode 108 are bonded so that their electrode forming surfaces are opposed to each other while maintaining a constant gap by a sealing material 90 including a spacer (not shown), and the liquid crystal 105 was sealed in this gap.

As the element substrate 100a and the counter substrate 100b, a substrate having optical transparency, such as glass or quartz, is used, respectively. As illustrated in FIG. 3, one side of the element substrate 100a overhangs the counter substrate 100b. A plurality of terminals 106 are provided in this overhang region along the X direction. One end of the FPC substrate 74 is coupled to the plurality of terminals 106. The other end of the FPC substrate 74 is coupled to the video processing device 200, and supplied with various signals and the like described above.

A pixel electrode 118 is formed on the surface of the element substrate 100a facing the counter substrate 100b by patterning a conductive layer having transparency such as ITO, for example. Note that ITO is an abbreviation for Indium Tin Oxide.

In addition, various elements other than the electrode are disposed on a facing surface of the element substrate 100a and a facing surface of the counter substrate 100b, but they are not shown in the figures.

Figure 5:
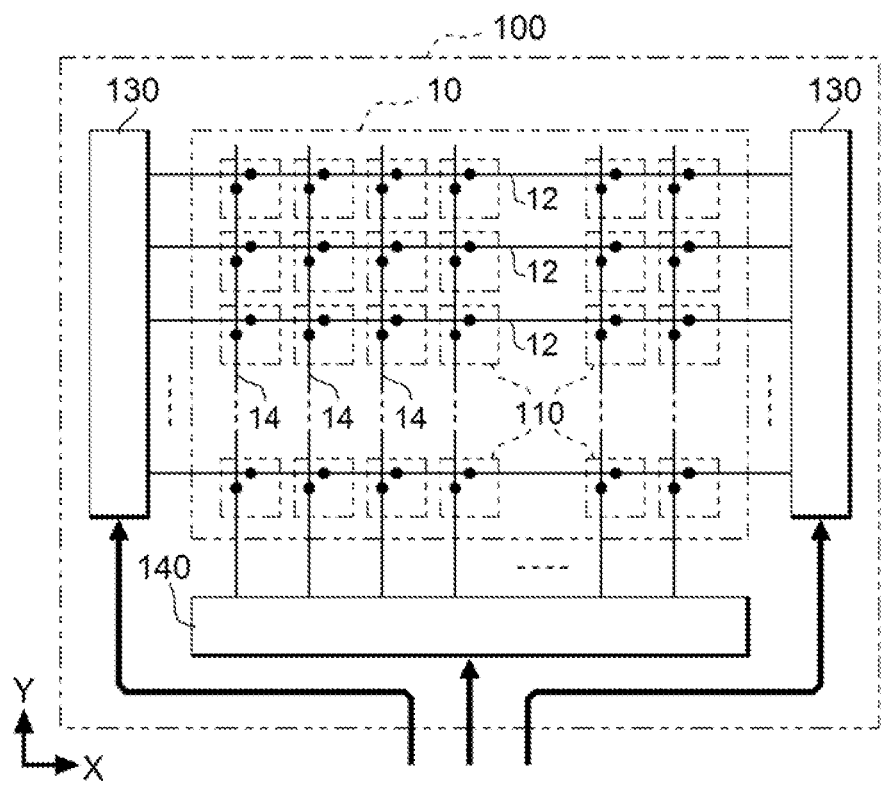
FIG. 5 is a block diagram illustrating an electrical configuration of the liquid crystal panel.

FIG. 5 is a block diagram illustrating the electrical configuration of the liquid crystal panel 100. The liquid crystal panel 100 is provided with a scanning line drive circuit 130 and a data line drive circuit 140 on the periphery of a display region 10.

In the display region 10 of the liquid crystal panel 100, pixel circuits 110 corresponding to pixels of an image to be displayed are arranged in a matrix. Specifically, in the display region 10, a plurality of scanning lines 12 are disposed extending in the X direction in the figure, and a plurality of data lines 14 are disposed extending in the Y direction, and to be electrically insulated with respect to the scanning lines 12. Then, the pixel circuit 110 is disposed in a matrix shape in corresponding to the intersection between the plurality of scanning lines 12 and the plurality of data lines 14.

When the number of scanning lines 12 is m and the number of data lines 14 is n, the pixel circuit 110 is arranged in a matrix in the vertical m rows and the horizontal n columns. m and n are both integers equal to or greater than 2. In the scanning lines 12 and the pixel circuits 110, in order to distinguish the rows of the matrix, the rows may be referred as 1, 2, 3, . . . , (m-1), and m row in order from the top in the figure. Similarly, in the data lines 14 and the pixel circuits 110, in order to distinguish the columns of the matrix, the columns may be referred as 1, 2, 3, . . . , (n-1), and n column in order from the left in the figure.

In accordance with the control by the display control circuit 210, the scanning line drive circuit 130 selects the scanning line 12 one by one in the order of, for example, 1, 2, 3, . . . , m rows, and sets the scanning signal to the selected scanning line 12 to an H level. Note that the scanning line drive circuit 130 sets the scanning signal to the scanning line 12 other than the selected scanning line 12 to an L level.

The data line drive circuit 140 latches the data signal supplied from the circuit of corresponding color of the processing circuit 220R, 220G, or 220B for one row, and outputs the data signal, in a period in which the scanning signal to the scanning line 12 is at the H level, to the pixel circuit 110 located in the scanning line 12 via the data line 14.

Figure 6:
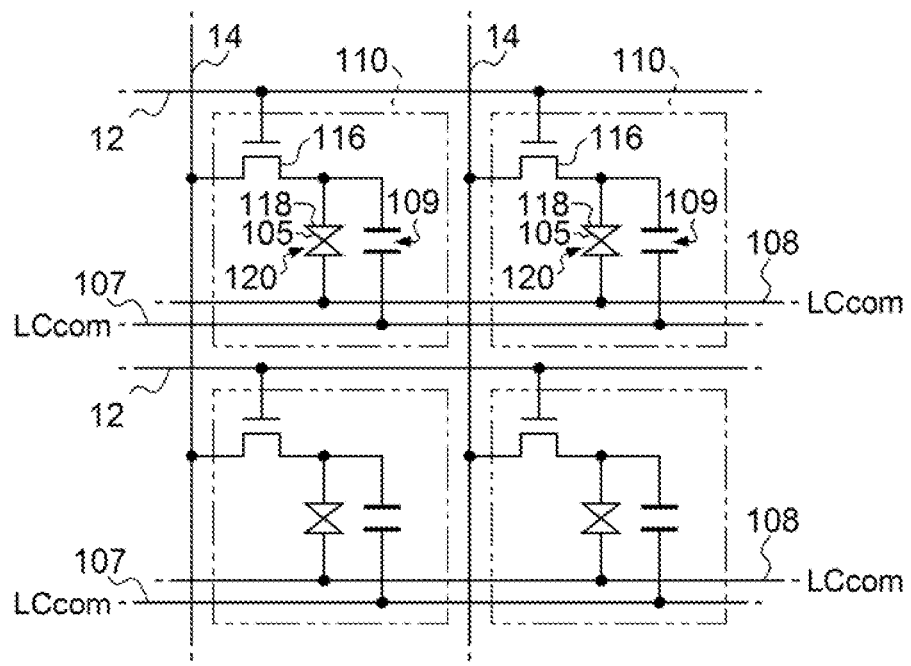
FIG. 6 is a diagram illustrating a configuration of a pixel circuit in the liquid crystal panel.

FIG. 6 is a diagram illustrating an equivalent circuit of a total of four pixel circuit 110 in two rows and two columns corresponding to the intersections of two adjacent scanning lines 12 and two adjacent data lines 14.

As illustrated in the figure, the pixel circuit 110 includes a transistor 116 and a liquid crystal element 120. The transistor 116 is, for example, an n-channel thin film transistor. In the pixel circuit 110, a gate node of the transistor 116 is coupled to the scanning line 12, while a source node of the transistor 116 is coupled to the data line 14, and the drain node of the transistor 116 is coupled to the substantially square shaped pixel electrode 118 in plan view.

A common electrode 108 is disposed in common for all the pixels so as to face the pixel electrode 118. A voltage LCcom is applied to the common electrode 108. In addition, the liquid crystal 105 is sandwiched between the pixel electrode 118 and the common electrode 108 as described above. Accordingly, the liquid crystal element 120 in which the liquid crystal 105 is sandwiched by the pixel electrode 118 and the common electrode 108 is configured for each pixel circuit 110.

In addition, a storage capacity 109 is disposed in parallel with the liquid crystal element 120. In the storage capacitor 109, one end is connected to the pixel electrode 118 and the other end is connected to a capacitance line 107. The capacitance line 107 is applied with a constant voltage in time, for example, the same voltage LCcom as the applied voltage to the common electrode 108. The pixel circuits 110 are arranged in a matrix shape in the X direction, which is the extension direction of the scanning lines 12, and the Y direction, which is the extension direction of the data lines 14, the pixel circuits 110 are arranged in the Y direction and the X direction as well.

In the scanning line 12 in which the scanning signal is at the H level, the transistor 116 of the pixel circuit 110 disposed corresponding to the scanning line 12 is turned on. When the transistor 116 is turned on, the data line 14 and the pixel electrode 118 are electrically connected, thus, the data signal supplied to the data line 14 reach the pixel electrode 118 via the transistor 116 which is turned on. The scanning line 12 falls to L level, then the transistor 116 is turned off, and the voltage of the data signal reached to the pixel electrode 118 is retained by the capacitance of the liquid crystal element 120 and a storage capacitor 109.

As is well known, in the liquid crystal element 120, the alignment of the liquid crystal molecules varies in accordance with the electric field generated by the pixel electrode 118 and the common electrode 108. Accordingly, the liquid crystal element 120 has a transmittance corresponding to an effective value of the applied voltage. Note that in the present embodiment, as the voltage applied to the liquid crystal element 120 increases, a normally black mode is set in which the transmittance is high.

The operation of supplying the data signal to the pixel electrode 118 of the liquid crystal element 120 is performed in the order as 1, 2, 3, . . . , m, according to this, the voltage corresponding to the data signal is retained by each of the liquid crystal elements 120 of the pixel circuit 110 arranged in the m row n columns. The retention of such a voltage results in the target transmittance of each liquid crystal element 120, and a transmitted image of the corresponding color is generated by pixels arranged in the m row n rows.

Next, a relationship between a pixel in which a gray scale level is specified in the video data Vda, a pixel represented by the liquid crystal panel 100, and a shift of the optical axis by the shift device 2300 will be described. Note that the shift device 2300 shifts the optical axis in the emission direction from the dichroic prism 2112 as described above, and for convenience, the shift amount is described in terms of the pixel of the image projected on the screen 2120.

FIG. 7A to FIG. 7D are diagrams for explaining the relationship between display resolution and panel resolution with pixel shift. In this figure, the display resolution refers to the pixel array in which the gray scale level is specified by the video data Vda, that is, the resolution indicated by the pixel array of the image to be displayed. Note that, in the pixel array of the display resolution of the left column in FIG. 7A, only a part of the pixel array in which the gray scale level is specified by the video data Vda is extracted.

Further, the panel resolution refers to the resolution indicated by the pixel array of the liquid crystal panel 100. Note that in the pixel array of the panel resolution of the right column in FIG. 7A, an array corresponding to the pixel array in the left column in FIG. 7A is extracted out of the pixel array in the liquid crystal panel 100.

Figures 7A, 7B, 7C, 7D:
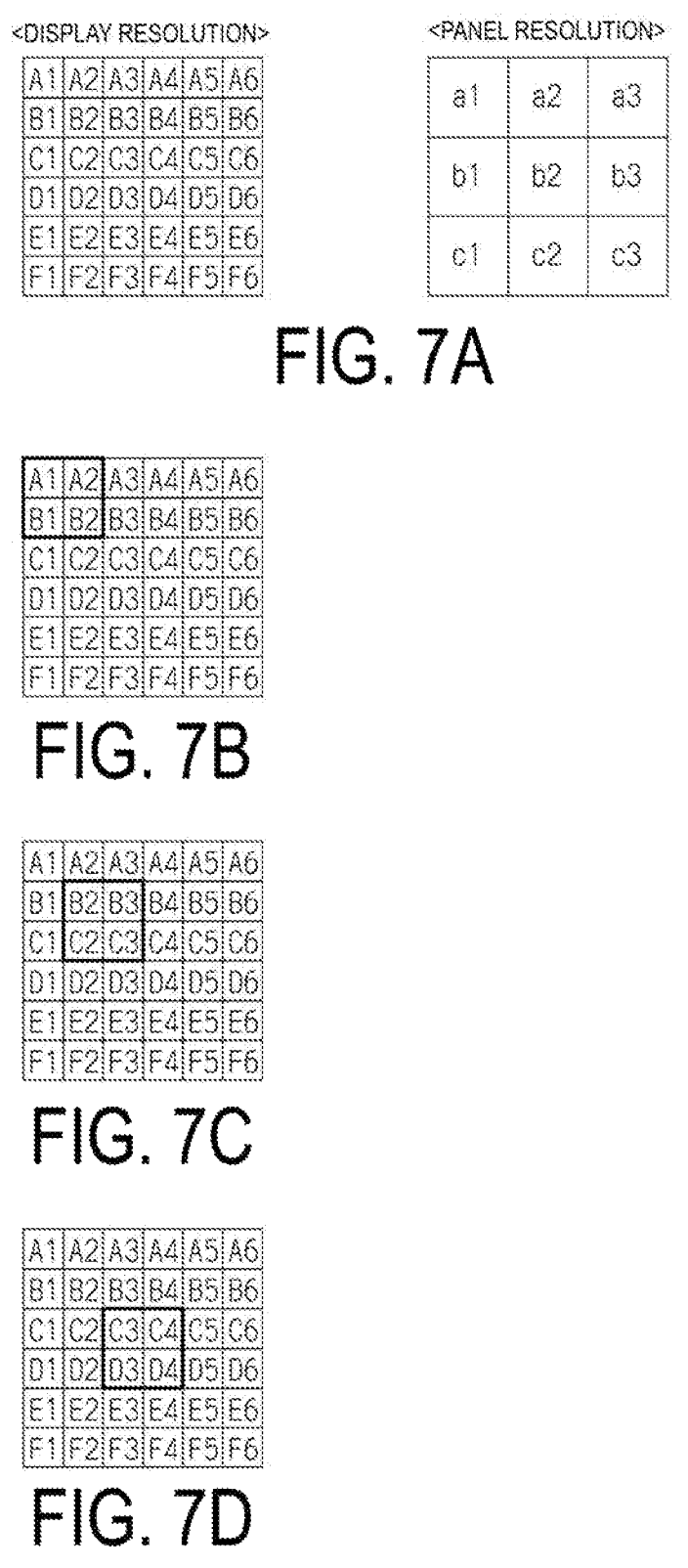

Note that of FIG. 7A, in order to distinguish the pixels specified by the video data Vda, the display resolution is denoted as that, a first row is assigned as A1, A2, . . . , a second row is assigned as B1, B2, . . . a third row is assigned as C1, C2, . . . . Similarly, in order to distinguish the pixels of the liquid crystal panel 100, the panel resolution is denoted as that, a first row is assigned as a1, a2, . . . , a second row is assigned as b1, b2, . . . a third row is assigned as c1, c2, . . . .

As described above, because the display resolution is twice as much in the vertical direction and twice as much in the horizontal direction with respect to the panel resolution, in the present embodiment, one pixel in the liquid crystal panel 100 represents four pixels specified by the video data Vda. Specifically, one frame period for displaying one frame of the video specified by the video data Vda supplied from the upstream device is divided into four unit periods, and the positions of the pixels to be projected are shifted in every unit period.

Here, the phrase that one pixel in the liquid crystal panel 100 represents a pixel specified by the video data Vda refers to that, a data signal obtained by converting the gray scale of the color component corresponding to the liquid crystal panel 100 among the pixels specificed by the image data Vda is supplied to the pixels in the liquid crystal panel 100. This causes the pixels in the liquid crystal panel 100 to have a transmittance corresponding to the gray scale level of the pixels specified by the video data Vda.

In a configuration in which the combination of four pixels represented by one pixel of the liquid crystal panel 100 in one frame period is the same as the combination of the four pixels represented in the next one frame period, when the alignment failure occurs, disruption of the display due to the alignment failure may be expanded and visually recognized. Thus, in the present embodiment, it is configured that when one pixel of the liquid crystal panel 100 represents four pixels of the video data Vda in one frame period, the pixel includes different pixels rather than the same four pixels in the next one frame period.

Figures 8, 9A, 9B:
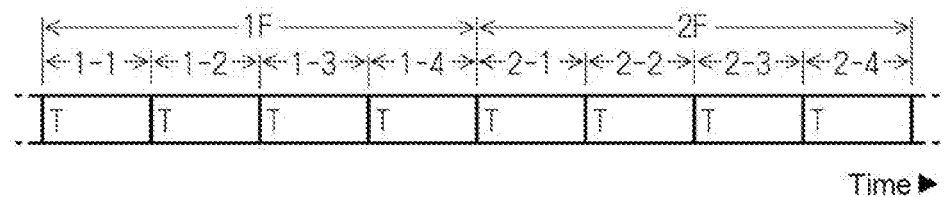
FIG. 8 is a diagram illustrating an example of a display specified in the video data.
FIG. 9A and FIG. 9B are diagrams illustrating a frame period and an unit period in the liquid crystal projector.

FIG. 8 is a diagram illustrating a frame period and an unit period according to the present embodiment.

As illustrated in this figure, in the present embodiment, the first frame period 1F and the second frame period 2F are divided.

The first frame period is divided into four unit periods. In order to conveniently distinguish the four unit periods T in the first frame period 1F, the symbol is assigned to 1-1, 1-2, 1-3, 1-4 in order of time. Similarly, the second frame period 2F is divided into four unit periods T. In order to conveniently distinguish the four unit periods T in the second frame period 2F, the symbol is assigned to 2-1, 2-2, 2-3, 2-4 in the order of time. Note that after the second frame period 2F, the process returns to the first frame period 1F.

In the present embodiment, in the first frame period 1F, the four pixels A1, A2, B1, and B2 illustrated in the thick frame in FIG. 7B are represented by the pixel a1 of the liquid crystal panel 100 in the first frame period 1F. In the second frame period 2F, the four pixels B2, B3, C2, and C3 illustrated in the thick frame in FIG. 7C are represented by the pixel a1 of the liquid crystal panel 100. Thus, the four pixels (pixels A1, A2, B1, and B2) represented by the pixel a1 in the first frame period 1F are different from the four pixels (B2, B3, C2, and C3) represented by the pixel a1 in the second frame period 2F. Specifically, the pixels represented by the pixel a1 are shared by the pixels B2 in the first frame period 1F and the second frame period 2F, but the other three pixels are different.

Note that in FIG. 7B and FIG. 7C, for the sake of convenience, the four pixels indicated by the thick frame are focused, but the other pixels are also represented in the same manner. For example, the pixels A3, A4, B3, and B4 are represented by pixel a2 of the liquid crystal panel 100 in the first frame period 1F.

Figure 10:
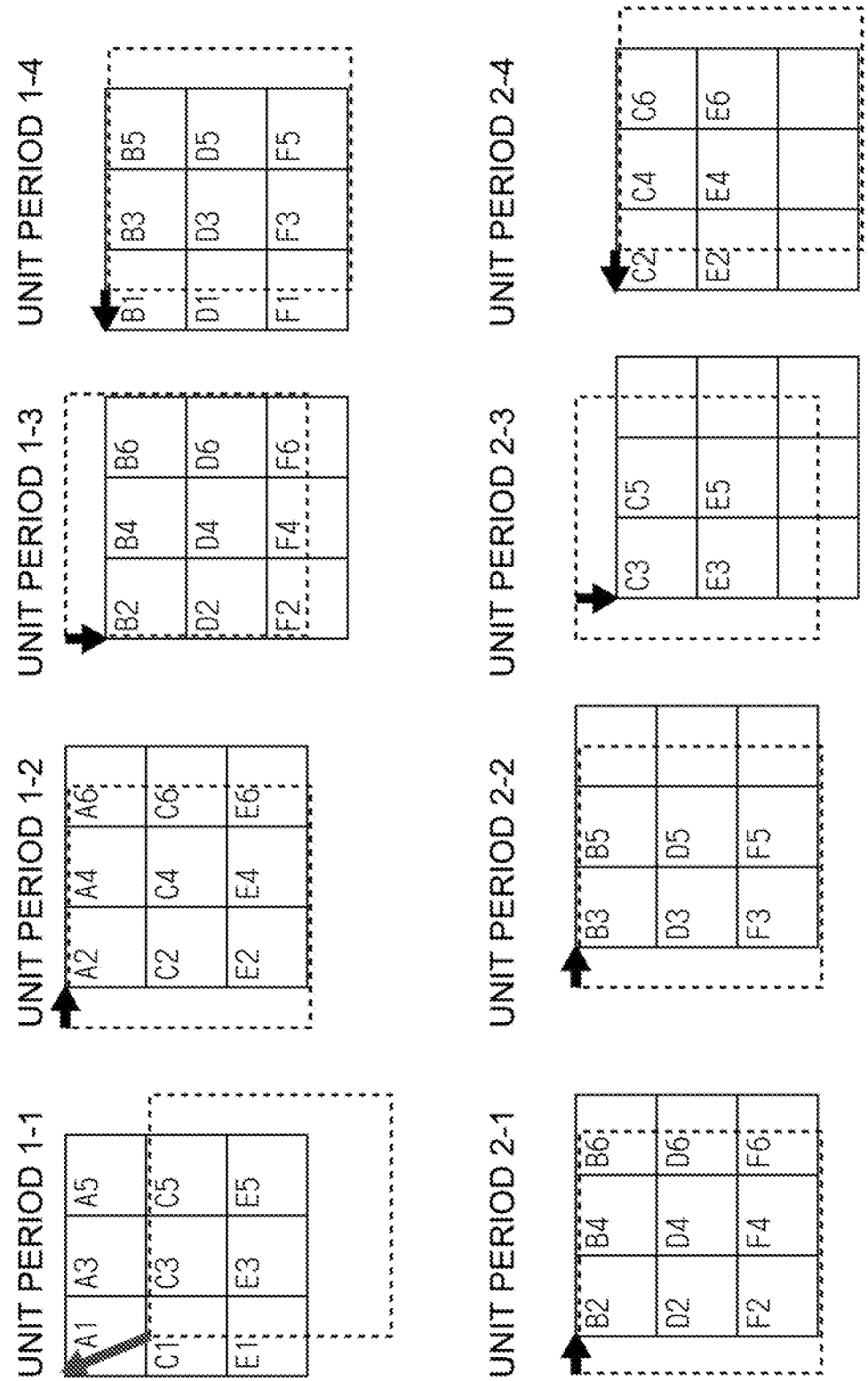
FIG. 10 is a diagram illustrating a relationship between a pixel represented by the liquid crystal panel and a shift position in a first embodiment.

FIG. 10 is a diagram illustrating a relationship between a pixel represented by the liquid crystal panel 100 of the liquid crystal projector 1 and a shift position according to the first embodiment. In detail, FIG. 10 is a diagram illustrating the relationship between the pixel of the video data Vda represented by nine pixels of the liquid crystal panel 100 illustrated as the panel resolution in FIG. 7A, the shift position in the unit period of the first frame period 1F and the second frame period 2F, and the nine pixels.

In the unit period 1-1 of the first frame period 1F, the pixels a1, a2, a3, b1, b2, b3, c1, c2, and c3 of the liquid crystal panel 100 sequentially represent pixels A1, A3, A5, C1, C3, C5, E1, E3 and E5 of video data Vda.

In the unit period 1-2 of the first frame period 1F, the shift device 2300 shifts the shift position from the shift position of the unit period 1-1 indicated by the dashed line by 0.5 pixels of the liquid crystal panel 100 in the right direction. In addition, in unit period 1-2, pixels a1, a2, a3, b1, b2, b3, c1, c2, and c3 of the liquid crystal panel 100 sequentially represent pixels A2, A4, A6, C2, C4, C6, E2, E4 and E6 of video data Vda.

In the unit period 1-3 of the first frame period 1F, the shift device 2300 shifts the shift position from the shift position of the unit period 1-2 indicated by the dashed line by 0.5 pixels of the liquid crystal panel 100 in the downward direction. In additon, in unit period 1-3, pixels a1, a2, a3, b1, b2, b3, c1, c2, and c3 of the liquid crystal panel 100 sequentially represent pixels B2, B4, B6, D2, D4, D6, F2, F4 and F6 of video data Vda.

In the unit period 1-4 of the first frame period 1F, the shift device 2300 shifts the shift position from the shift position of the unit period 1-3 indicated by the dashed line by 0.5 pixels of the liquid crystal panel 100 in the left direction. In additon, in unit period 1-4, the pixels a1, a2, a3, b1, b2, b3, c1, c2, and c3 of the liquid crystal panel 100 sequentially represent pixels B1, B3, B5, D1, D3, D5, F1, F3 and F5 of video data Vda.

In the unit period 2-1 of the second frame period 2F, the shift device 2300 shifts the shift position from the shift position of the unit period 1-4 indicated by the dashed line by 0.5 pixels of the liquid crystal panel 100 in the right direction. In addition, in unit period 2-1, pixels a1, a2, a3, b1, b2, b3, c1, c2, and c3 of the liquid crystal panel 100 sequentially represent pixels B2, B4, B6, D2, D4, D6, F2, F4 and F6 of video data Vda.

In the unit period 2-2 of the second frame period 2F, the shift device 2300 shifts the shift position from the shift position of the unit period 2-1 indicated by the dashed line by 0.5 pixels of the liquid crystal panel 100 in the right direction. In addition, in the unit period 2-2, pixels a1, a2, b1, b2, c1, and c2 of the liquid crystal panel 100 sequentially represent pixels B3, B5, D3, D5, F3, and F5 of the video data Vda. Note that, the pixels represented by the pixels a3, b3, and c3 of the liquid crystal panel 100 are out of the display resolution in FIG. 7A, and thus the reference numerals are omitted in the unit period 2-2.

In the unit period 2-3 of the second frame period 2F, the shift device 2300 shifts the shift position from the shift position of the unit period 2-2 indicated by the dashed line by 0.5 pixels of the liquid crystal panel 100 in the downward direction. In addition, in the unit period 2-3, the pixels a1, a2, b1, and b2 of the liquid crystal panel 100 sequentially represent pixels C3, C5, E3, and E5 of the video data Vda. Note that, the pixels represented by the pixels a3, b3, c1, c2, and c3 of the liquid crystal panel 100 are out of the display resolution in FIG. 7A, and thus the reference numerals are omitted in the unit period 2-3.

In the unit period 2-4 of the second frame period 2F, the shift device 2300 shifts the shift position from the shift position of the unit period 2-3 indicated by the dashed line by 0.5 pixels of the liquid crystal panel 100 in the left direction. In addition, in the unit period 2-4, pixels a1, a2, a3, b1, b2, and b3 of the liquid crystal panel 100 sequentially represent pixels C2, C4, C6, E2, E4, and E6 of the video data Vda. Note that, the pixels represented by the pixels c1, c2, and c3 of the liquid crystal panel 100 are out of the display resolution in FIG. 7A, and thus the reference numerals are omitted in the unit period 2-4.

After the unit period 2-4, the shift device 2300 shifts the shift position from the shift position of the unit period 2-4 indicated by the dashed line by 0.5 pixels of the liquid crystal panel 100 in the left direction and by 1 pixels of the liquid crystal panel 100 in the upper direction, and returns the shift position to the position in the unit period 1-1.

Before describing effect of the liquid crystal projector 1 according to the embodiment, a reduction of the display quality due to alignment failure will be described.

Figure 15A:
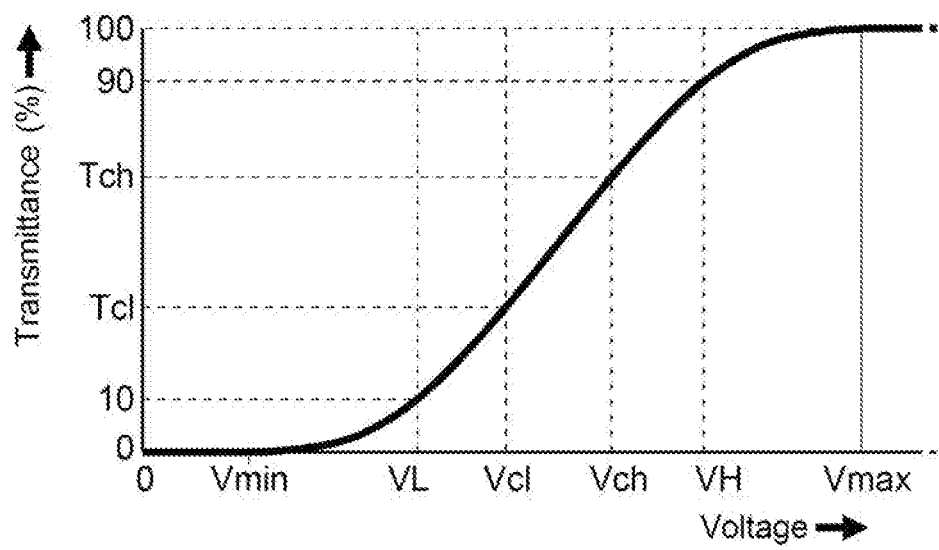
FIG. 15A and FIG. 15B are diagrams illustrating an example of voltage-transmittance characteristics of a liquid crystal element in the liquid crystal panel.

FIG. 15A is a diagram illustrating an example of a characteristic (V-T characteristic) of the applied voltage and transmittance of the liquid crystal element 120 when the liquid crystal element 120 is in the normally black mode. In the normally-black mode, in a pixel (bright pixel) in which a high gray scale level is specified and the transmittance becomes high, the applied voltage of the liquid crystal element 120 is high. On the other hand, in a pixel (dark pixel) in which a low gray scale level is specified and the transmittance becomes low, the applied voltage of the liquid crystal element 120 is low. The light pixel and the dark pixel are defined for convenience as follows.

The bright pixel is a pixel in which, when a voltage corresponding to the gray scale level is applied to the pixel electrode 118, the applied voltage to the liquid crystal element 120 including the pixel electrode 118 exceeds VH, and the dark pixel is a pixel in which the applied voltage to the liquid crystal element 120 is below VL. Here, with respect to the VH and VL, VH>VL. In addition, when the applied voltage to the liquid crystal element 120 is the voltage VL, for example, the relative transmittance is 10%, and when it is the voltage VH, for example, the relative transmittance is 90%. However, the VL and VH may be voltage corresponding to other relative transmittance.

Figure 15B:
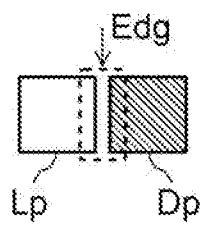

As illustrated in FIG. 15B, in the liquid crystal panel 100, when the bright pixel Lp and the dark pixel Dp are adjacent to each other, the voltage difference between the pixel electrodes 118 becomes large, and the alignment failure of the liquid crystal molecules is likely to occur due to the horizontal electric field near the boundary Edg between the two pixels. In general, the greater the voltage difference between the pixel electrodes 118, the greater the degree of the alignment failure that occurs near the boundary between the adjacent two pixels. The pixel in which the alignment defect occurs does not have a transmittance corresponding to the gray scale level, so the display quality is reduced.

In the present embodiment, in a configuration in which the pixel of the liquid crystal panel 100 is shifted in two axes by the shift device 2300, even if the image specified by the video data Vda is a still image, in other words, even if there is no change in the gray scale level of the pixels when comparing the frames before and after, for the pixel of the liquid crystal panel 100, the gray scale level may change as described below.

Next, the relationship between the pixel represented by the liquid crystal panel 100 and the shift position in the comparative example will be described.

Figure 16:
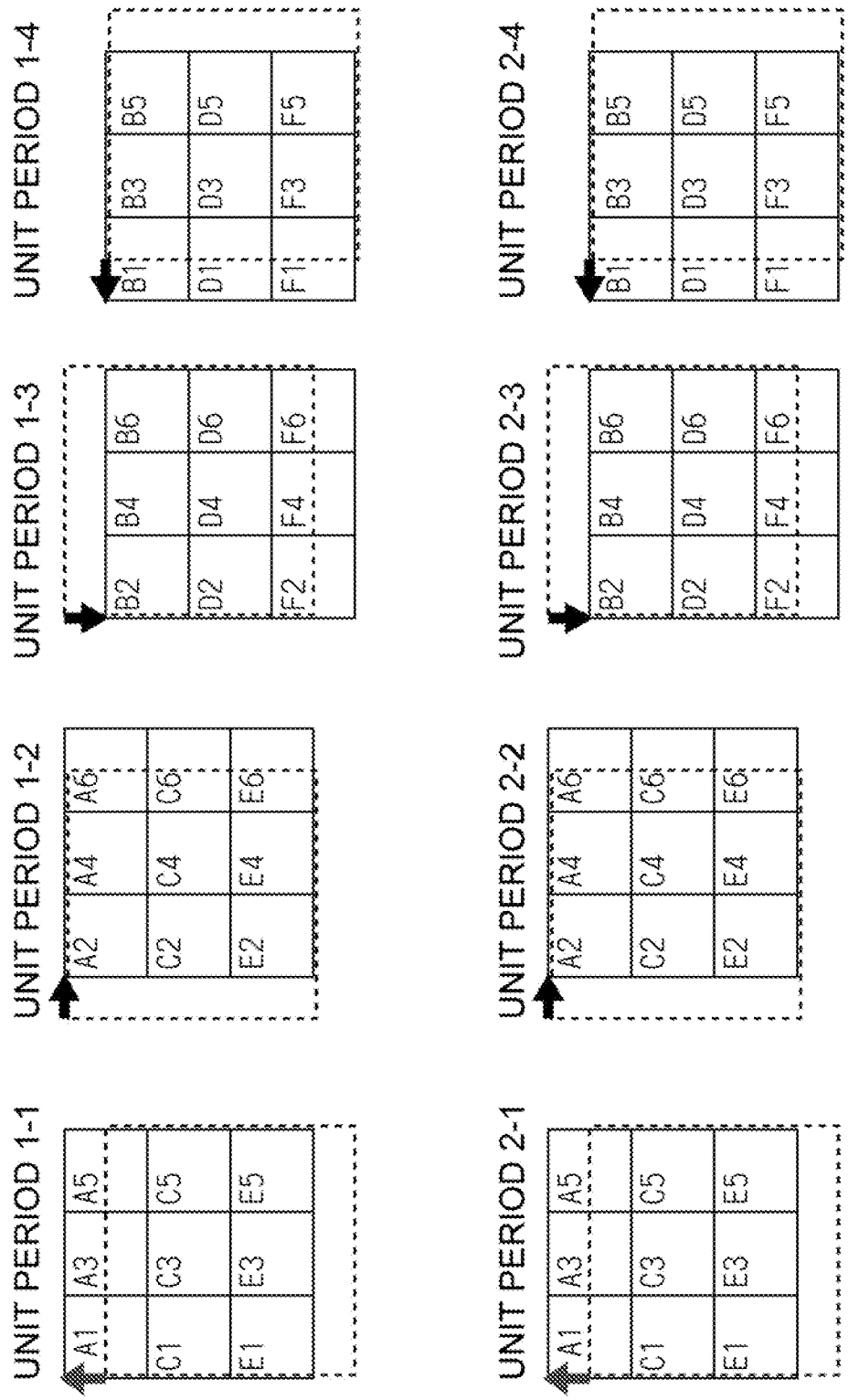
FIG. 16 is a diagram illustrating a relationship between a pixel represented by the liquid crystal panel and a shift position in a comparative example.

FIG. 16 is a diagram illustrating a relationship between a pixel represented by the liquid crystal panel 100 and a shift position according to the comparative example.

As described above, in the related art, the combination of four pixels represented by one pixel of the liquid crystal panel 100 in one frame period is the same as the combination of the four pixels represented in the next one frame period. In FIG. 16, although it is divided into a first frame period and a second frame period for convenience, pixels represented by the liquid crystal panel 100 and shift positions in the unit periods 1-1 to 1-4 of the illustrated first frame period are the same as the pixels represented by the liquid crystal panel 100 and the shift positions in the unit period 2-1 to 2-4 of the second frame period.

In addition, in FIG. 16, the pixels represented by the liquid crystal panel 100 and the shift positions in the unit periods 1-1 to 1-4 of the first frame period and the pixels represented by the liquid crystal panel 100 and the shift positions in the unit periods 2-1 to 2-4 of the second frame period are the same as the pixels represented by the liquid crystal panel 100 and the shift positions in the unit periods 1-1 to 1-4 of the first frame period illustrated in FIG. 10.

Figure 17:
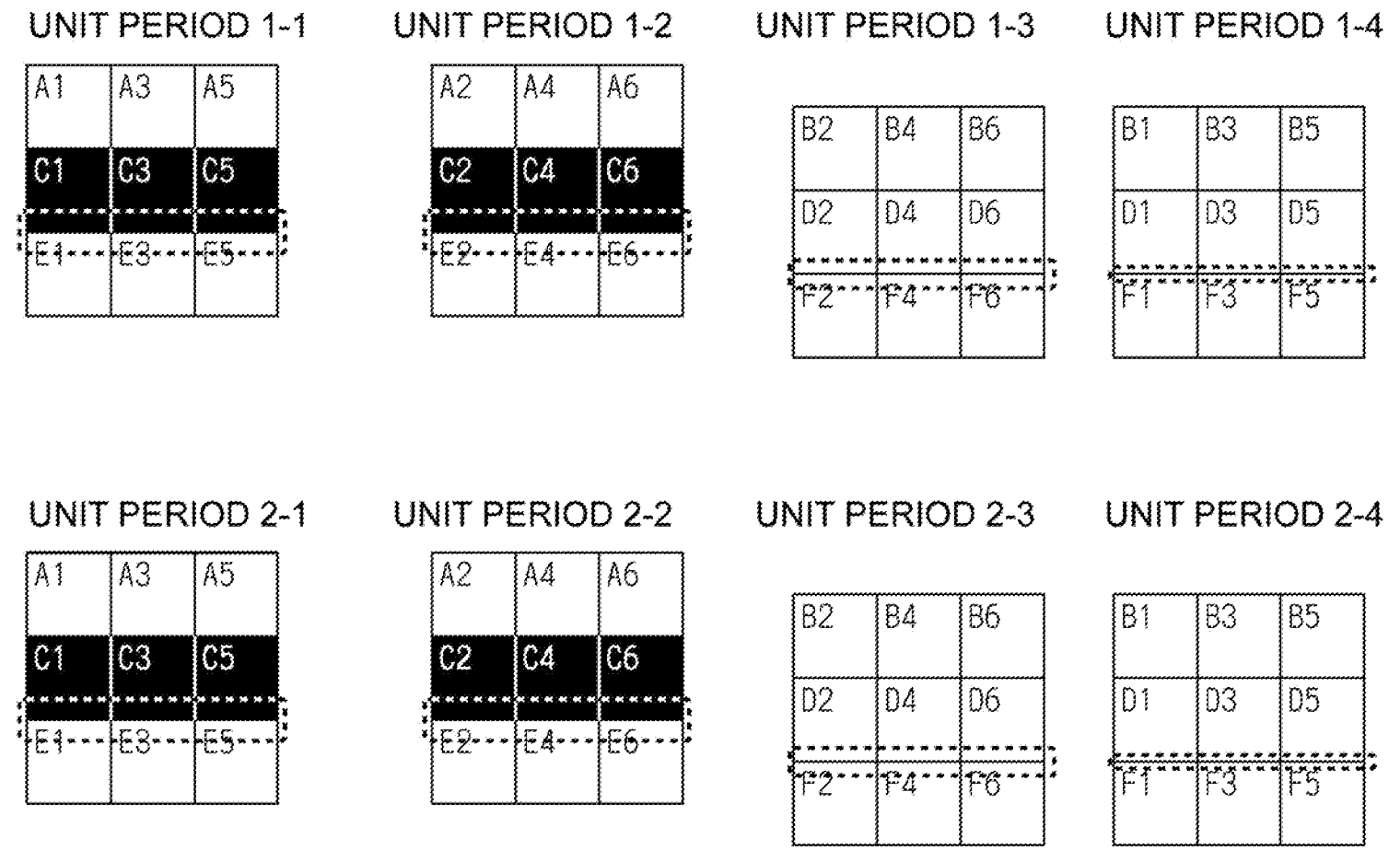

When the gray scale of the pixels specified by the video data Vda is specified as illustrated in FIG. 9A, in the comparative example, one pixel in the liquid crystal panel 100 represents four pixels specified with video data Vda, as illustrated in FIG. 17.

Specifically, as illustrated in FIG. 9A, when the pixels C1 to C6 are specified as dark pixels with the light pixels as background as illustrated in FIG. 9A, in the unit periods 1-1 and 2-1, the pixels b1, b2, and b3 of the liquid crystal panel 100 represent pixels C1, C3, and C5 specified as the dark pixels in this order. In the unit periods 1-2 and 2-2, The pixels b1, b2, and b3 of the liquid crystal panel 100 represent pixels C2, C4, and C6 specified as the dark pixel in this order.

Thus, as illustrated in FIG. 17, in the unit periods 1-1, 1-2, 2-1, and 2-2, since the light pixels are adjacent to the dark pixels, the alignment failure occurs as indicated by the dashed lines in the vicinity of the boundary between the adjacent portions. Note that, the alignment failure is only indicated in the vicinity of the boundary between the C1 and C6 and E1 to E6, but in practice, the alignment failure also occurs in the vicinity of the boundary between A1 to A6 and C1 to C6.

In the unit periods 1-3, 1-4, 2-3, and 2-4, the pixels C1 to C6 specified as the dark pixels are not represented, and only light pixels are represented. However, the alignment failure occurred in the unit period 1-2 remains even when the pixels C2, C4, C6 change into light pixels in the unit period 1-3. The degree is small in the unit period 1-4, but the alignment failure continues to remain. Similarly, the alignment failure occurred in the unit period 2-2 remains even only the light pixels are represented in the unit periods 2-3 and 2-4.

In addition, the alignment failure occurred in the unit period 1-2 is shifted by 0.5 pixels of the liquid crystal panel 100 in the lower direction and remains in the unit period 1-3. As a result, the alignment failure is visually recognized as if it is extended. Similarly, the alignment failure occurred in the unit period 2-2 is shifted by 0.5 pixels of the liquid crystal panel 100 in the lower direction in the unit period 2-3 and remains, thus, the alignment failure is visually recognized as if it is extended.

Eventually, in the comparative example, the alignment failure occurred in the unit period 1-1, 1-2 remains in the unit period 1-3, 1-4 and is visually recognized as that they are extended by the shift, and, similarly, the alignment failure occurred in the unit period 2-1, 2-2 remains in the unit period 2-3, 2-4 and is visually recognized as that they are extended by the shift.

Figure 11:
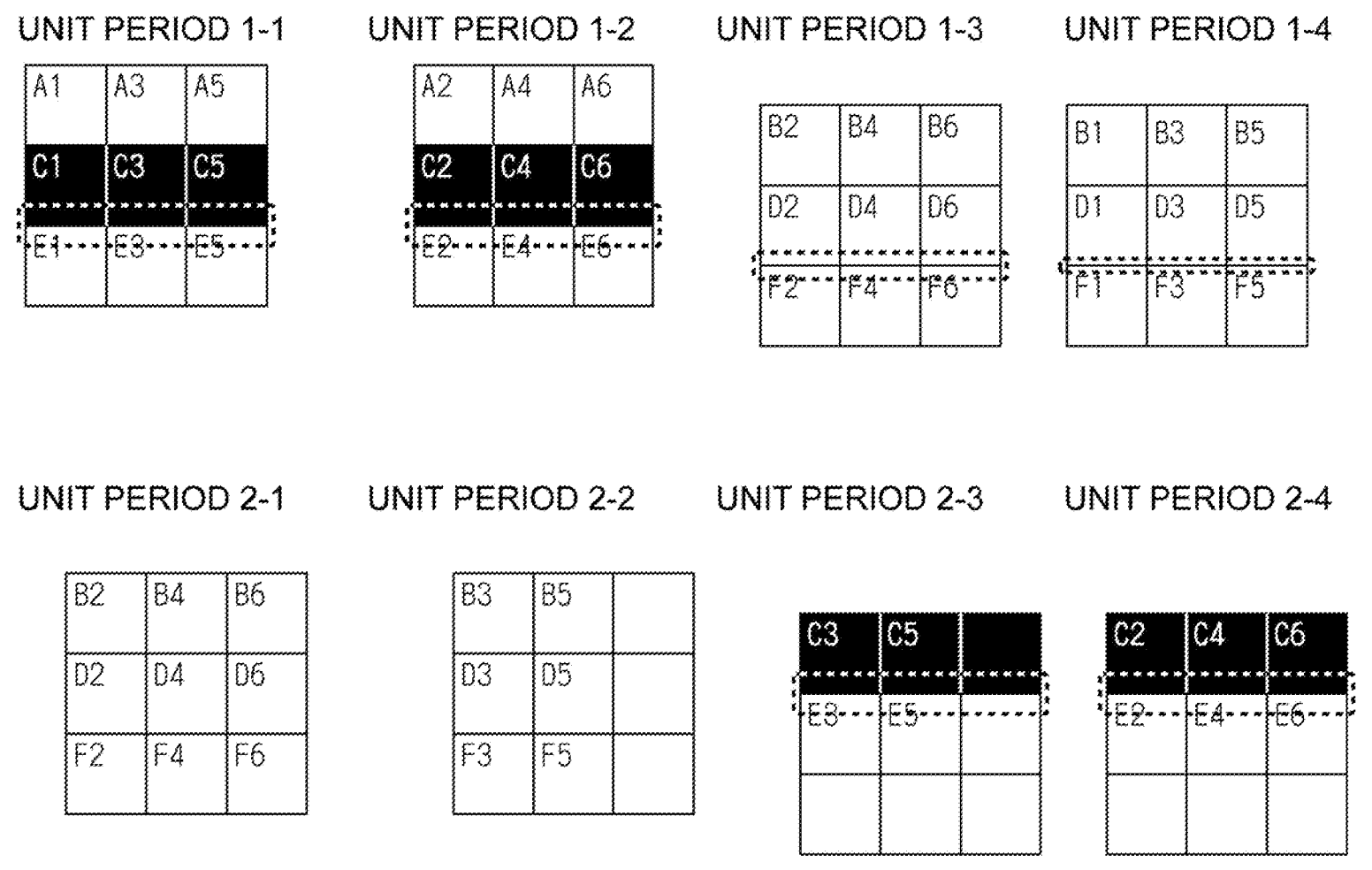

In the present embodiment, when the gray scale of the pixel specified by the video data Vda is specified as illustrated in FIG. 9A, the pixel of the liquid crystal panel 100 represents the pixel specified by the video data Vda, as illustrated in FIG. 11.

Specifically, as illustrated in FIG. 9A, when the pixels C1 to C6 are specified as dark pixels with the light pixels as background as illustrated in FIG. 9A, in the unit periods 1-1 and 1-4 in the first frame period, the pixel to be represented and the shift position are the same as those of the comparative example. However, in the present embodiment, in the second fraim period, pixels of the liquid crystal panel 100 in the unit periods 2-3 and 2-4 represent the dark pixels specified by the video data Vda.

Therefore, according to the present embodiment, the alignment failure occurred in the unit period 1-2 is suppressed to a degree where remaining alignment failure is not noticeable over time in the unit period 2-1, 2-2. In addition, In the unit periods 2-3 and 2-4, the light pixels are adjacent to the dark pixels, so that the alignment failure is occurred in the vicinity of the boundary between the C1 to C6 and E1 to E6, that is in the case of the liquid crystal panel 100, the alignment failure is occurred in the vicinity of the boundary between the pixels a1 to a3 and the pixels b1 to b3, but in the next unit periods 1-1 and 1-2, the pixels b1 to b3 including the boundary become dark pixels to obscure remaining alignment failure. Thus, the alignment failure occurred in the unit periods 2-3 and 2-4 becomes not noticeable in the next unit periods 1-1 and 1-2.

Thus, in the present embodiment, when viewing over the entire period of the unit period 1-1 to 1-4 and the unit period 2-1 to 2-4, with respect to the comparative example, remaining alignment failure can be less likely to be visually recognized or less noticeable.

As in the comparative example, when a combination of four pixels represented by one pixel of the liquid crystal panel 100 in a certain one frame period is the same as the combination of four pixels represented in the next one frame period, since there is the same representation in the certain frame period and the next frame period, when the alignment failure occurs, the alignment failure will occur again before the alignment failure becomes noticeable. In contrast, as in the present embodiment, when a combination of four pixels represented by one pixel of the liquid crystal panel 100 in the first frame period 1F differs from the combination of the four pixels represented in the second frame period 2F, since there is not the same representation in the certain frame period and the next frame period, even if the alignment failure occurs, it is possible to increase the possibility that the alignment failure will not be noticeable.

The same applies to that, when the dark pixel is other than C1 to C6 with the light pixel as a background in the pixels specified by the video data Vda. For example, as illustrated in FIG. 9B, when the pixels D1 to D6 are specified as dark pixels with the light pixels as backgrounds, in the present embodiment, the pixels of the liquid crystal panel 100 represent pixels specified by the video data Vda, as illustrated in FIG. 12.

Specifically, as illustrated in FIG. 9B, when the pixels D1 to D6 are specified as dark pixels with the light pixels as backgrounds as illustrated in FIG. 9B, in the present embodiment, since the pixels b1 to b3 of the liquid crystal panel 100 are dark pixels over the unit period 1-3, 1-4, 2-1 and 2-2, the alignment failure occurs in the vicinity of the boundary with the pixels c1 to c3, although it remains over 2-3 and 2-4, in the unit periods 1-1 and 1-2, the remaining is suppressed to a degree that is not noticeable over time.

Figure 12:
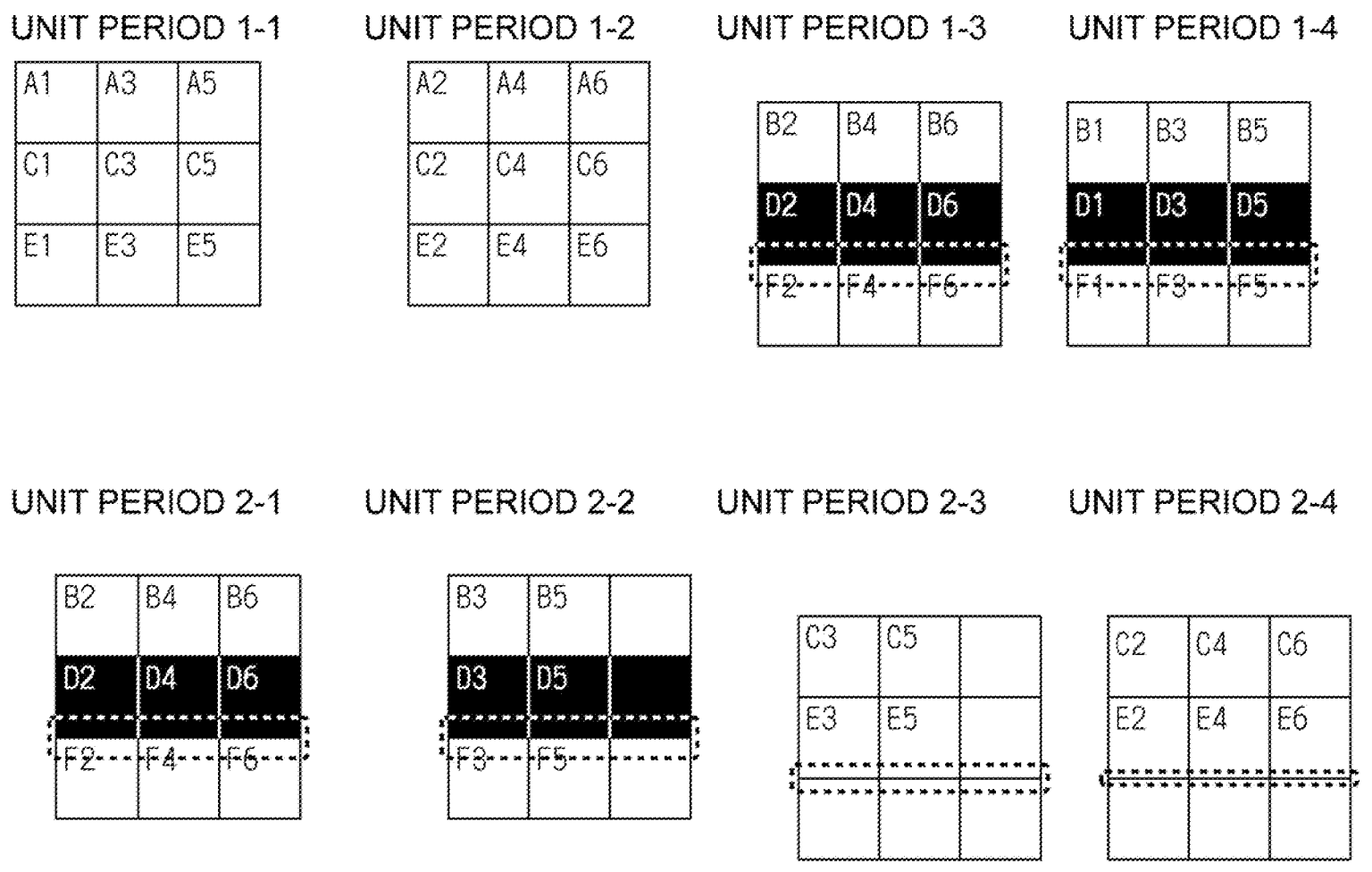

Note that, while the figures are omitted, when the pixels D1 to D6 are specified as dark pixels with light pixels as backgrounds as illustrated in FIG. 9B, in the comparative example, the unit period 1-1 to 1-4 in FIG. 12 is repeated.

Thus, in the unit periods 1-3 and 1-4 in the comparative example, the alignment failure occurred in the vicinity of the boundary between the pixels C1 to C6 and E1 to E6, that is, in the case of the liquid crystal panel 100, the alignment failure occurred in the vicinity of the boundary between the pixels a1 to a3 and the pixels b1 to b3 is occurred again before being noticeable. Furthermore, in the comparative example, when returning to the unit period 1-1, the alignment failure is shifted by 0.5 pixels of the liquid crystal panel 100 in the upper direction and remains, so the alignment failure is visually recognized as if it is extended.

In the first exemplary embodiment, when returning from the unit period 2-4 to the unit period 1-1, the shift device 2300 shifts the shift position by 0.5 pixels of the liquid crystal panel 100 in the left direction and shifts upward by 1.0 pixels. Therefore, since the shift amount of the shift device 2300 is only increased at this time, when the shift device 2300 has low response characteristics, the shift position does not follow, which may lead to deterioration in display quality. Therefore, a second embodiment in which this point is improved will be described.

Figure 13:
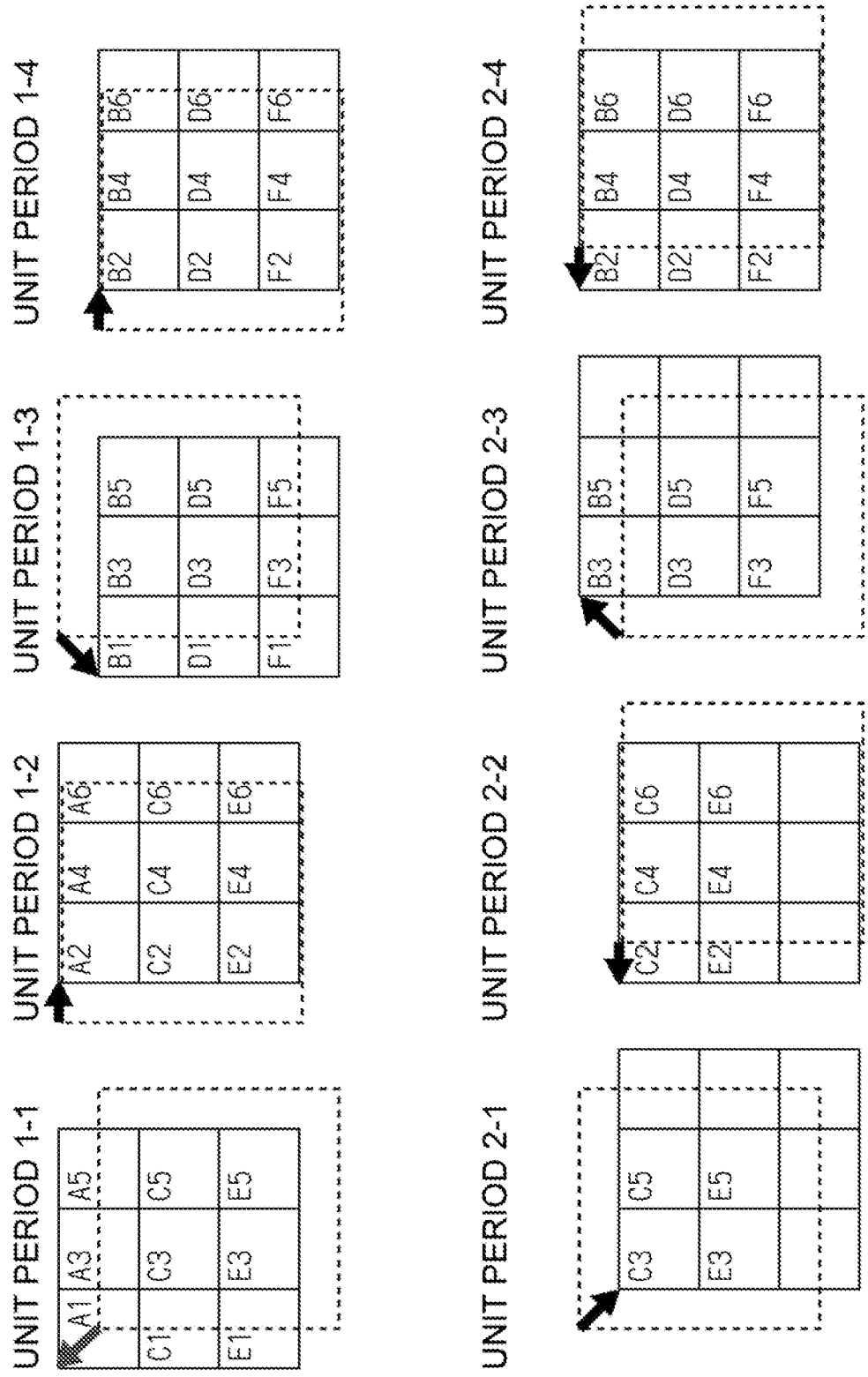
FIG. 13 is a diagram illustrating a relationship between a pixel represented by the liquid crystal panel and a shift position in a second embodiment.

FIG. 13 is a diagram illustrating a relationship between pixels represented by the liquid crystal panel 100 of the liquid crystal projector 1 and a shift position according to the second exemplary embodiment. In detail, FIG. 13 is a diagram illustrating the relationship between the pixel of the video data Vda represented by nine pixels of the liquid crystal panel 100 illustrated as the panel resolution in FIG. 7A in the same manner as in FIG. 10, a shift position in unit periods of the first frame period 1F and the second frame period 2F, and the nine pixels.

As illustrated in FIG. 13, the unit periods 1-1 and 1-2 of the first frame period 1F are the same as in FIG. 10.

In the unit period 1-3 of the first frame period 1F, the shift device 2300 shifts the shift position from the shift position of the unit period 1-2 indicated by the dashed line to 0.5 pixels of the liquid crystal panel 100 in the left direction and by 0.5 pixels of the liquid crystal panel 100 in the lower direction. In addition, in unit period 1-3, pixels a1, a2, a3, b1, b2, b3, c1, c2, and c3 of the liquid crystal panel 100 sequentially represent pixels B1, B3, B5, D1, D3, D5, F1, F3 and F5 of video data Vda.

In the unit period 1-4 of the first frame period 1F, the shift device 2300 shifts the shift position from the shift position of the unit period 1-3 indicated by the dashed line by 0.5 pixels of the liquid crystal panel 100 in the right direction. In addition, in unit period 1-4, the pixels a1, a2, a3, b1, b2, b3, c1, c2, and c3 of the liquid crystal panel 100 sequentially represent pixels B2, B4, B6, D2, D4, D6, F2, F4 and F6 of video data Vda.

In the unit period 2-1 of the second frame period 2F, the shift device 2300 shifts the shift position from the shift position of the unit period 1-4 indicated by the dashed line to 0.5 pixels of the liquid crystal panel 100 in the right direction and 0.5 pixels of the liquid crystal panel 100 in the lower direction. In addition, in unit period 2-1, pixels a1, a2, b1, and b2 of the liquid crystal panel 100 sequentially represent pixels C3, C5, E3, and E5 of the video data Vda. Note that, the pixels represented by the pixels a3, b3, c1, c2, and c3 of the liquid crystal panel 100 are out of the display resolution in FIG. 7A, and thus the reference numerals are omitted in the unit period 2-1.

In the unit period 2-2 of the second frame period 2F, the shift device 2300 shifts the shift position from the shift position of the unit period 2-1 indicated by the dashed line by 0.5 pixels of the liquid crystal panel 100 in the left direction. In addition, in unit period 2-2, pixels a1, a2, a3, b1, b2, and b3 of the liquid crystal panel 100 sequentially represent pixels C2, C4, C6, E2, E4, and E6 of the video data Vda. Note that, the pixels represented by the pixels c1, c2, and c3 of the liquid crystal panel 100 are out of from the display resolution in FIG. 7A, and thus the reference numerals are omitted in the unit period 2-2.

In the unit period 2-3 of the second frame period 2F, the shift device 2300 shifts the shift position from the shift position of the unit period 2-2 indicated by the dashed line by 0.5 pixels of the liquid crystal panel 100 in the right direction and 0.5 pixels of the liquid crystal panel 100 in the upward direction. In addition, in the unit period 2-3, the pixels a1, a2, b1, b2, c1, and c2 of the liquid crystal panel 100 sequentially represent pixels B3, B5, D3, D5, F3, and F5 of the video data Vda. Note that the pixels represented by the pixels a3, b3, and c3 of the liquid crystal panel 100 are out of the display resolution in FIG. 7A, and thus the reference numerals are omitted in the unit period 2-3.

In the unit period 2-4 of the second frame period 2F, the shift device 2300 shifts the shift position from the shift position of the unit period 2-3 indicated by the dashed line by 0.5 pixels of the liquid crystal panel 100 in the left direction. In addition, in unit period 2-4, pixels a1, a2, a3, b1, b2, b3, c1, c2, and c3 of the liquid crystal panel 100 sequentially represent pixels B2, B4, B6, D2, D4, D6, F2, F4 and F6 of video data Vda.

Note that after the unit period 2-4, the shift device 2300 shifts the shift position from the shift position of the unit period 2-4 indicated by the dashed line to 0.5 pixels of the liquid crystal panel 100 in the left direction and 0.5 pixels of the liquid crystal panel 100 in the upward direction, and back to the position in the unit period 1-1.

Thus, the four pixels (pixels A1, A2, B1, and B2) represented by the pixel a1 in the first frame period 1F are different from the four pixels (B2, B3, C2, and C3) represented by the pixel a1 in the second frame period 2F.

According to the second exemplary embodiment, the shift amount caused by the shift device 2300 when the unit period transitions is aligned in the left or right direction or the upper or lower direction by 0.5 pixels of the liquid crystal panel 100. In other words, according to the second embodiment, since the maximum value of the shift amount in the horizontal direction or the vertical direction is equal to 0.5 pixels, degradation of display quality due to the difference in shift amount can be suppressed.

In the first embodiment and the second embodiment, when one pixel of the liquid crystal panel 100 represents a pixel designated by the video data Vda, the pixels represented in the first frame period 1F and the four pixels represented in the second frame period 2F are partially overlapping, but may not overlap.

Thus, a third embodiment will be described in which one pixel of the liquid crystal panel 100 is different from the four pixels represented in the first frame period 1F and the four pixels represented in the second frame period 2F.

In the third exemplary embodiment, similar to the first embodiment, in the first frame period 1F, the four pixels A1, A2, B1, and B2 illustrated in the thick frame in FIG. 7B are represented by the pixels a1 of the liquid crystal panel 100 in the first frame period 1F. However, in the third exemplary embodiment, in contrast to the first exemplary embodiment, in the second frame period 2F, the four pixels C3, C4, D3, and D4 shown in the thick frame in FIG. 7D are represented by the pixels a1 of the liquid crystal panel 100.

Figure 14:
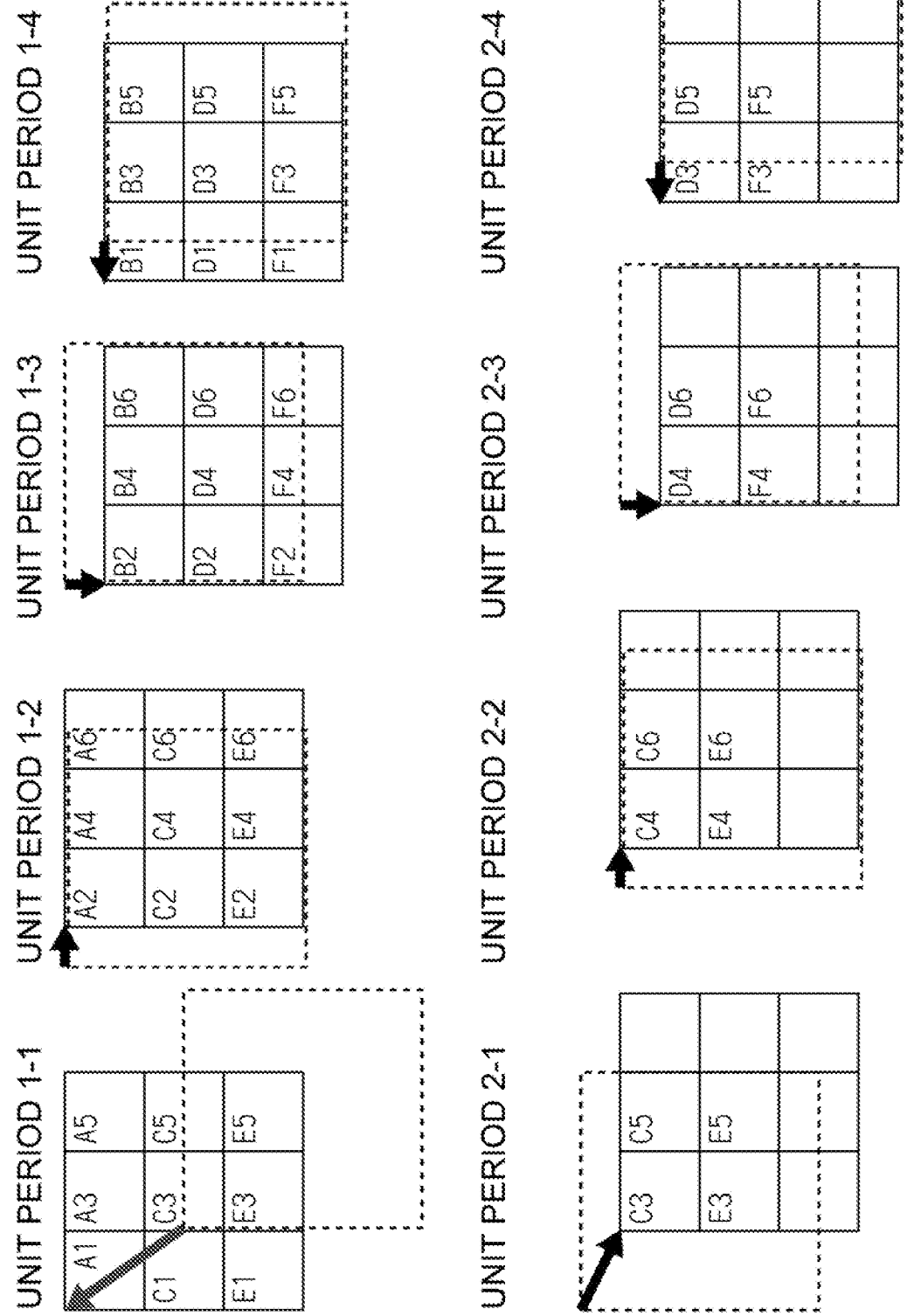
FIG. 14 is a diagram illustrating a relationship between a pixel represented by the liquid crystal panel and a shift position in a third embodiment.

FIG. 14 is a diagram illustrating a relationship between pixels represented by the liquid crystal panel 100 of the liquid crystal projector 1 according to the second exemplary embodiment and a shift position. In detail, FIG. 14 is a diagram illustrating the relationship between the pixel of the video data Vda represented by nine pixels of the liquid crystal panel 100 illustrated as the panel resolution in FIG. 7A in the same manner as in FIG. 10, a shift position in unit periods of the first frame period 1F and the second frame period 2F, and the nine pixels.

As illustrated in FIG. 14, the unit period 1-1, 1-2, 1-3, 1-4 of the first frame period 1F is similar to FIG. 10.

In the third exemplary embodiment, in the unit period 2-1 of the second frame period 2F, the shift device 2300 shifts the shift position from the shift position of the unit period 1-4 indicated by the dashed line to 0.5 pixels of the liquid crystal panel 100 in the right direction and 0.5 pixels of the liquid crystal panel 100 in the lower direction. In addition, in unit period 2-1, pixels a1, a2, b1, and b2 of the liquid crystal panel 100 sequentially represent pixels C3, C5, E3, and E5 of the video data Vda. Note that, the pixels represented by the pixels a3, b3, c1, c2, and c3 of the liquid crystal panel 100 are out of the display resolution in FIG. 7A, and thus the reference numerals are omitted in the unit period 2-1. In the unit period 2-2 of the second frame period 2F, the shift device 2300 shifts the shift position from the shift position of the unit period 2-1 indicated by the dashed line by 0.5 pixels of the liquid crystal panel 100 in the right direction. In addition, in unit period 2-2, pixels a1, a2, b1, and b2 of the liquid crystal panel 100 sequentially represent pixels C4, C6, E4, and E6 of the video data Vda in order. Note that, for the pixels represented by the pixels a3, b3, c1, c2, and c3 of the liquid crystal panel 100, the pixel is separated from the display resolution in FIG. 7A, and thus the reference numerals are omitted in unit period 2-2.

In the unit period 2-3 of the second frame period 2F, the shift device 2300 shifts the shift position from the shift position of the unit period 2-2 indicated by the dashed line by 0.5 pixels of the liquid crystal panel 100 in the downward direction. In addition, in the unit period 2-3, the pixels a1, a2, b1, and b2 of the liquid crystal panel 100 sequentially represent pixels D4, D6, F4, and F6 of the video data Vda. Note that, the pixels represented by the pixels a3, b3, c1, c2, and c3 of the liquid crystal panel 100 are out of the display resolution in FIG. 7A, and thus the reference numerals are omitted in the unit period 2-3.

In the unit period 2-4 of the second frame period 2F, the shift device 2300 shifts the shift position from the shift position of the unit period 2-3 indicated by the dashed line by 0.5 pixels of the liquid crystal panel 100 in the right direction. In addition, in the unit period 2-4, pixels a1, a2, b1, and b2 of the liquid crystal panel 100 sequentially represent pixels D3, D5, F3, and F5 of the video data Vda. Note that, for the pixels represented by the pixels a3, b3, c1, c2, and c3 of the liquid crystal panel 100, the pixel is separated from the display resolution in FIG. 7A, and thus the reference numerals are omitted in the unit period 2-4.

After the unit period 2-4, the shift device 2300 shifts the shift position from the shift position of the unit period 2-4 indicated by the dashed line to the position in the unit period 1-1 by shifting 1.5 pixels of the liquid crystal panel 100 in the left direction and 1.5 pixels of the liquid crystal panel 100 in the upward direction.

Thus, the four pixels (pixels A1, A2, B1, and B2) represented by the pixel a1 in the first frame period 1F are all different from the four pixels (C2, C3, D3, and D4) represented by the pixel a1 in the second frame period 2F. Specifically, the pixels represented by the pixel a1 do not have common pixels in the first frame period 1F and the second frame period 2F.

In the third exemplary embodiment, the four pixels represented in the first frame period 1F of one pixel of the liquid crystal panel 100 are different from any of the four pixels represented in the second frame period 2F. thus, even when the dark pixel is displayed with the light pixel as the background, for example as illustrated in FIG. 9A, the dark pixel state is limited to two unit periods.

Specifically, when the contents of FIG. 9A are displayed, the pixels b1, b2, and b3 of the liquid crystal panel 100 only have a dark pixel in the unit periods 1-1 and 1-2. Note that the dark pixels in the unit periods 2-1 and 2-2 are pixels a1, a2, and a3 of the liquid crystal panel 100, and are different from the pixels b1, b2, and b3 in the unit period 1-1, 1-2.

Therefore, in the third embodiment as well, similar to the first embodiment, residual alignment failure can be made less likely to be visually recognized or obscure for the comparative example.

Note that the first frame period 1F is an example of one frame period, and the second frame period 2F is an example of the next frame period of the one frame period.

R (red) is an example of a first color, and the liquid crystal panel 100R is an example of a first liquid crystal panel. G (green) is an example of a second color, a liquid crystal panel 100G is an example of a second liquid crystal panel, b (blue) is an example of a third color, and the liquid crystal panel 100B is an example of a third liquid crystal panel.

Furthermore, the axis defined in the upper direction and the lower direction is an example of the first axis, and the axis defined in the left direction and the right direction is an example of the second axis.

In the first to third embodiments, one frame period is divided into four unit periods. In other words, n is described as "4". However, n is not limited to "4", and may be "2" or greater. n may be a value of square "4," "9," "16," . . . . For example, when n is "9", one pixel in the liquid crystal panel 100 represents, for example, nine (3×3) pixels in the video data Vda with different shift positions. In this case, it is sufficient that one pixel in the liquid crystal panel 100 in the first frame 1F differs from the combination of the nine pixels represented in the first frame 1F and the nine pixels represented in the second frame 2F.

In addition, the maximum shift amount is 1.5 pixels in the vertical or horizontal direction, but if the response in the shift device 2300 is good, the shift amount may be 2 pixels or more.

Further, in the above-described embodiments and the like, the normally black mode has been described, but the normally white mode may be used. In addition, the liquid crystal panel 100R, 100G, and 100B are transmissive type, but they may also be reflective type.

What is claimed is:

1. A liquid crystal projector comprising:
    a liquid crystal panel having a pixel circuit that modulates light based on video data corresponding to each of pixels of an image specified by the video data; and
    a shift device configured to shift the modulated light by the pixel circuit so that a position of a projected pixel on a screen by the modulated light is shifted for each of the pixels, wherein
    the pixel circuit modulates n pixels of a first group, n being an integer of 2 or more, from among the pixels in first frame period, and modulates n pixels of a second group from among the pixels in second frame period next to the first frame period,
    the n pixels of the first group correspond to one pixel of the liquid crystal panel,
    the n pixels of the second group correspond to the one pixel of the liquid crystal panel, and
    the n pixels of the first group share one common pixel with the n pixels of the second group, with the other pixels of the n pixels of the first group being different from the other pixels of the n pixels of the second group.

2. The liquid crystal projector according to claim 1, wherein
    the shift device is configured to shift the position of the projected pixel along a first axis and along a second axis different from the first axis so that a maximum value of a shifting amount along the first axis is substantially equal to a maximum value of a shifting amount along the second axis consistent.

3. The liquid crystal projector according to claim 1, wherein
    the liquid crystal panel includes
    a first liquid crystal panel corresponding to a first color, the first liquid crystal panel having a first pixel circuit;
    a second liquid crystal panel corresponding to a second color different from the first color, the second liquid crystal panel having a second pixel circuit; and
    a third liquid crystal panel corresponding to a third color different from the first color and the second color, the third liquid crystal panel having a third pixel circuit, and
    the liquid crystal panel combines modulated light by the first pixel circuit, modulated light by the second pixel circuit, and modulated light by the third pixel circuit, thereby forming the projected pixel.

4. The liquid crystal projector according to claim 1, wherein the common pixel has a position that does not shift between the first frame and the second frame.

\* \* \* \* \*